(12) United States Patent
Yoshida

(10) Patent No.: US 9,027,960 B1
(45) Date of Patent: May 12, 2015

(54) FRONT AIRBAG DEVICE

(71) Applicant: Autoliv Development AB, Vårgårda (SE)

(72) Inventor: Yuichiro Yoshida, Yokohama (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 14/361,810

(22) PCT Filed: Oct. 9, 2012

(86) PCT No.: PCT/JP2012/076097
§ 371 (c)(1),
(2) Date: May 30, 2014

(87) PCT Pub. No.: WO2013/080671
PCT Pub. Date: Jun. 6, 2013

(30) Foreign Application Priority Data

Nov. 30, 2011 (JP) .................................. 2011-263142

(51) Int. Cl.
*B60R 21/203* (2006.01)
*B60R 21/231* (2011.01)
*B60R 21/217* (2011.01)

(52) U.S. Cl.
CPC .............. *B60R 21/203* (2013.01); *B60R 21/231* (2013.01); *B60R 21/2037* (2013.01); *B60R 21/217* (2013.01)

(58) Field of Classification Search
CPC .............. B60R 21/203; B60R 21/2035; B60R 21/2037; B60R 21/217; B60R 21/2176
See application file for complete search history.

(56) References Cited

U.S. PATENT DOCUMENTS

| | | | |
|---|---|---|---|
| 7,976,059 B2 * | 7/2011 | Fujita et al. | .................... 280/731 |
| 8,511,707 B2 * | 8/2013 | Amamori et al. | .......... 280/728.2 |
| 2003/0173759 A1 | 9/2003 | Grenier | |
| 2004/0046367 A1 * | 3/2004 | Schneider et al. | .......... 280/728.2 |
| 2005/0017484 A1 * | 1/2005 | Worrell et al. | ................. 280/731 |
| 2009/0309337 A1 * | 12/2009 | Groleau et al. | ............. 280/728.2 |
| 2009/0315304 A1 * | 12/2009 | Hagelgans et al. | ......... 280/728.2 |
| 2012/0080868 A1 * | 4/2012 | Banno et al. | ................ 280/728.2 |

FOREIGN PATENT DOCUMENTS

| | | | |
|---|---|---|---|
| JP | 2007-145112 A | 6/2007 | |
| JP | 2011-213251 A | 10/2011 | |

OTHER PUBLICATIONS

Japanese Patent Office, English Translation of International Search Report of PCT/JP2012/076097, Mailed on Jan. 15, 2013, 1 page.

* cited by examiner

*Primary Examiner* — Paul N Dickson
*Assistant Examiner* — Timothy Wilhelm
(74) *Attorney, Agent, or Firm* — Brinks Gilson & Lione

(57) ABSTRACT

A front airbag device in which an airbag module can be detached from a steering wheel with a simpler operation is provided. A front airbag device includes a steering wheel and an airbag module. The airbag module includes a housing. The steering wheel includes a positioning hook and a retaining hook. The housing includes a positioning tab on which the positioning hook is hooked and a rod-shaped elastic body on which the retaining hook is hooked. The positioning tab has an extension portion, and the steering wheel has a window portion which enables the extension portion to be visible from the outside. The positioning tab is tilted whereby the positioning tab is disconnected from the positioning hook and the elastic body can move.

13 Claims, 8 Drawing Sheets

B-B Cross-section

B-B Cross-section (a)

(b)

(a)

(b)

FRONT AIRBAG DEVICE

BACKGROUND

1. Field of the Invention

The present invention relates to a front airbag device including a steering wheel of a vehicle and an airbag module attached to the center of the steering wheel.

2. Related Technology

At present, airbags are mounted on almost every vehicle (automobile). Airbags come in various types depending on where they are installed and on their purposes. For example, a front airbag generally used for protecting a driver is installed near the center of a steering wheel. In this case, the front airbag is folded in a small size in a housing that accommodates the front airbag and is covered with a cover.

Most front airbags having such a configuration are configured as airbag modules that are separated from a steering wheel. For example, an airbag device disclosed in Patent Literature 1, identified below, is separated from a steering wheel. A rod-shaped spring steel called an attachment rod is attached to a rear surface of a case of the airbag device, and the spring steel is connected to a hook of the steering wheel, whereby the airbag device is attached to the steering wheel. The spring steel can be bent, and the use of these spring steel and hook enables the airbag device of Patent Literature 1 to be easily attached to and detached from the steering wheel.

Patent Literature 1: Japanese Patent Application Publication No. 2007-145112

The airbag device of Patent Literature 1 described above has a structure in which a detachment jig is inserted from a rear side of the steering wheel, and the detachment jig is operated to disconnect the spring steel from the hook, whereby the airbag device is detached from the steering wheel. Although the airbag device having such a detachable structure is convenient since maintenance of the airbag can be performed even after the vehicle is operated, it may be more preferable if the detachment can be realized with a simpler operation.

With the foregoing in view, an object of the present invention is to provide a front airbag device in which an airbag module can be detached from a steering wheel with a simpler operation.

SUMMARY

In order to solve the problem, according to a representative aspect of the present invention, there is provided a front airbag device including a steering wheel of a vehicle and an airbag module that is attached to the center of the steering wheel, wherein the airbag module includes an airbag and a housing that stores the airbag, the steering wheel includes: a positioning hook that is hooked on the housing so as to restrict the position of the airbag module; and a retaining hook that extends toward the housing so as to prevent removal of the airbag module by being hooked on the housing when the airbag module moves in a direction of being removed from the steering wheel, the housing includes: a positioning tab on which the positioning hook is hooked and which is configured to be connected to or disconnected from the positioning hook by being bent and tilted; and an elastic body on which the retaining hook is hooked when the airbag module moves in the direction of being removed from the steering wheel, the positioning tab is provided near the elastic body, the positioning tab further includes an extension portion that extends the shape of the positioning tab, the steering wheel further includes a window portion that allows the extension portion to be visible from the outside, and the positioning tab is tilted to press, bend, and move the elastic body so as to prevent the elastic body from making contact with the retaining hook as well as being disconnected from the positioning hook.

According to the configuration, when the airbag module only is detached after respective members are assembled, the airbag module can be detached with a simple operation of inserting a general tool represented by a driver, for example, in the window portion of the steering wheel and pressing the extension portion with the tool to tilt the positioning tab. Thus, the labor and time required for operations when performing the maintenance of the airbag or the like can be reduced.

The positioning tab may further include an extrusion portion that has a shape that protrudes toward the elastic body and that moves the elastic body. With this extrusion portion, since the elastic body can be moved more, the detaching operation of the airbag module becomes easier.

The housing may have a gap formed on a side, toward which the positioning tab is tilted, so that the positioning tab is tilted. With this configuration, the detaching operation of the airbag module becomes easier.

The positioning tab may be provided near an end portion of the elastic body. The elastic body can be realized by a rod-shaped spring or the like, for example, and it is easier to press and bend the elastic body when force is applied to the end portion. Thus, the positioning tab is provided near the end portion so that the elastic body can be pressed and bent with smaller force. Thus, the detaching operation of the airbag module becomes easier.

An edge of the extrusion portion on the side of the elastic body may be inclined such that the edge protrudes further toward the elastic body as the protrusion of the edge gradually increases upward. According to this configuration, since the more the extension portion is bent, the larger the moving distance of the elastic body becomes when the elastic body is pressed by the extrusion portion, the detaching operation of the airbag module becomes easier.

An edge of the extrusion portion on the side of the elastic body may draw an arc so as to protrude further toward the elastic body as the protrusion of the edge gradually increases upward. With this configuration, when the elastic body is pressed and moved, the edge can be moved more easily so as to make point-contact with the elastic body. Moreover, with this configuration, since the more the extension portion is bent, the larger the moving distance of the elastic body becomes when the elastic body is pressed by the extrusion portion, the detaching operation of the airbag module becomes easier.

An edge of the extrusion portion on the side of the elastic body may draw an S-curve so as to protrude further toward the elastic body as the protrusion of the edge gradually increases upward. With this configuration, the edge makes point-contact with the elastic body and the elastic body can be moved more easily so as to follow the edge. Moreover, with this configuration, since the more the extension portion is bent, the larger the moving distance of the elastic body becomes when the elastic body is pressed by the extrusion portion, the detaching operation of the airbag module becomes easier.

The extension portion may have a groove portion which is formed in an upper end surface of the extension portion and in which a predetermined tool can be inserted. With the groove portion having this shape, since a screw driver can engage with the groove portion, the extension portion can be easily pressed toward the elastic body.

The extension portion may have a hole portion which is formed in an upper end surface of the extension portion and in which a predetermined tool can be inserted. For example, although the hole portion is just a rectangular hole, when the hole portion is formed in a certain size, a tool having a large width can be inserted therein. When the tool can be inserted therein, the extension portion can be easily pressed.

The extension portion may have a surface on a side opposite to the tilting direction, which is inclined toward the tilting direction with respect to the extension direction of the extension portion. With this configuration, when a tool is inserted from the window portion, the extension portion can be easily pressed by the tool. Thus, with this configuration, the detaching operation of the airbag module becomes easier.

The retaining hook may extend in a direction where the airbag module is removed, and the housing may have a guide portion that allows the elastic body to move only in a direction orthogonal to the extension direction of the retaining hook. With this configuration, the elastic body can be moved efficiently in only the direction of avoiding the retaining hook. Thus, the detaching operation of the airbag module becomes easier.

The steering wheel may further include a steering cover which is an external cover and is attached to an opposite side of the steering wheel to the airbag module, and the window portion may include an opening portion formed in the steering cover. With this configuration, only the airbag module can be easily detached even after the entire device is assembled into the vehicle.

The window portion may allow an opposite side of the extension portion to the tilting direction to be visible. With this configuration, pressing of the extension portion using the tool can be performed easily.

According to the present invention, it is possible to provide a front airbag device in which an airbag module can be detached from a steering wheel with a simpler operation.

EXPLANATION OF REFERENCE NUMERALS

Figure 1:
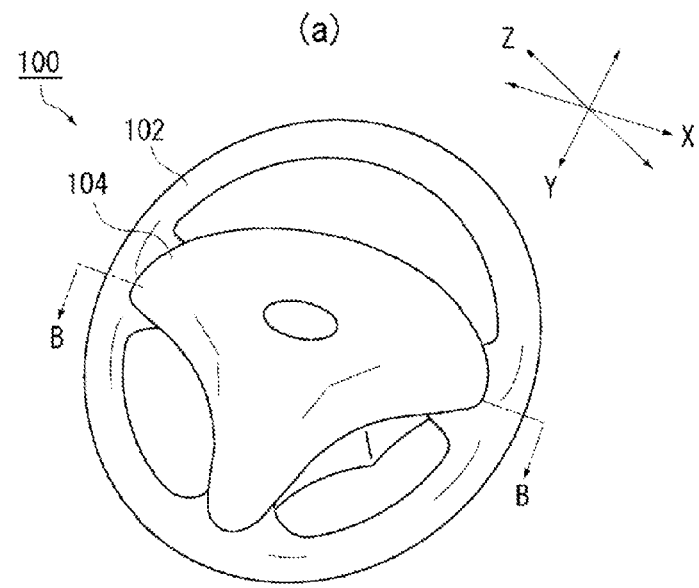
FIGS. 1A and 1B are diagrams illustrating a front airbag device according to an embodiment of the present invention.
Figure 1:
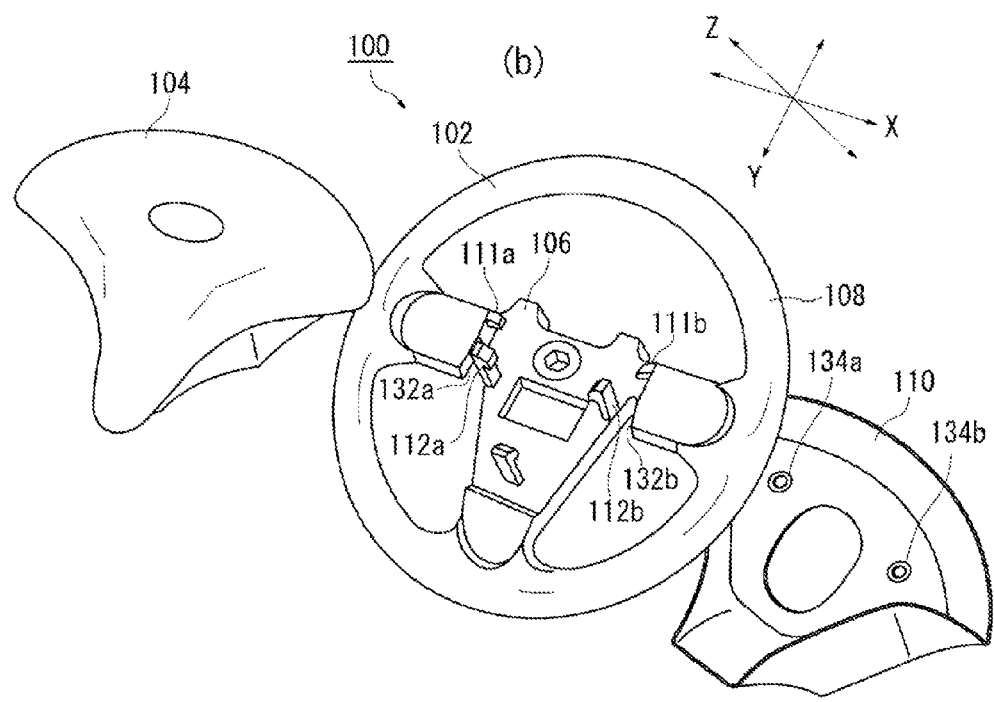

E1: Gap
D3: Direction of spring
D4: Direction orthogonal to direction of spring
100: Front airbag device
102: Steering wheel
104: Airbag module
106: Metal portion
108: Ring portion
110: Steering cover
112a, 112b: Retaining hook
114: Airbag
116: Housing
117: Hole
118: Cover
120a, 120b: Spring
122a, 122b: End portion
124a, 124b: Positioning tab
126, 126b, 400, 500, 600: Extension portion
128, 200, 300: Extrusion portion
130, 202, 302: Edge of extrusion portion
132a, 132b: Opening portion
180: Tool
402, 502: Upper end surface
404: Groove portion
504: Hole portion

DESCRIPTION OF PREFERRED EMBODIMENTS

Preferred embodiments of the present invention will be explained next in detail with reference to accompanying drawings. Dimensions, materials, other specific numerical values and the like given in the embodiments are only illustrative in character, for the sake of easier understanding of the invention, and, unless particularly stated otherwise, are not meant to limit the present invention in any way. In the description and the drawings, elements having substantially the same function and configuration are denoted by identical reference numerals, and a recurrent explanation thereof will be omitted. Elements that are not directly related to the present invention are omitted in the drawings.

FIGS. 1A and 1B are diagrams illustrating a front airbag device 100 according to an embodiment of the present invention. FIG. 1A illustrates an entire structure of the front airbag device 100. In the following drawings including FIG. 1A, directions are indicated on the supposition that the front airbag device 100 is attached to a vehicle such that a direction of a steering column (shaft) (not illustrated) is Z-axis, and a direction from the 9 o'clock position to the 3 o'clock position is X-axis and a direction from the 6 o'clock position to the 12 o'clock position is Y-axis when the 12 o'clock position of a 12-hour analog clock is on the vehicle front side in a plane orthogonal to the Z-axis.

The front airbag device 100 illustrated in FIG. 1A is a device for protecting a driver and is configured to include a steering wheel 102 and an airbag module 104 attached near the center of the steering wheel 102.

The airbag module 104 also functions as a horn switch. Thus, a spring member (not illustrated) is provided between the airbag module 104 and the steering wheel 102, for example, and the airbag module 104 is configured to be pressed toward the steering wheel 102.

FIG. 1B is an exploded view of the front airbag device 100 illustrated in FIG. 1A. A metallic core member (metal portion 106) is used for the steering wheel 102 illustrated in FIG. 1B, and a ring portion 108 or the like grasped by the driver is covered with a resin. Moreover, the steering wheel 102 is covered with a resinous steering cover 110 which is attached to a rear surface side of the steering wheel 102 opposite to the airbag module 104.

Positioning hooks 111a and 111b are provided on the metal portion 106 of the steering wheel 102. The positioning hooks 111a and 111b are portions which are hooked on a housing 116 (see FIG. 2B) of the airbag module 104. Due to this, although the airbag module 104 attached to the steering wheel 102 is configured to be movable slightly in the Z direction in order to function as a horn switch, the movement is restricted (positioned) to a predetermined range by the positioning hooks 111a and 111b.

Moreover, retaining hooks 112a and 112b are provided on the metal portion 106. The retaining hooks 112a and 112b are portions provided mainly to prevent the airbag module 104 from falling off. The retaining hooks 112a and 112b extend toward the airbag module 104 (in particular, the housing 116 illustrated in FIG. 2B). The retaining hooks 112a and 112b are caught in the housing 116 to prevent the airbag module 104 from falling off when the airbag module 104 moves in a direction (identical to the Z-axis direction) of being removed from the steering wheel 102 during operation of an airbag 114 (see FIG. 2A), for example.

The front airbag device 100 illustrated in FIG. 1A is in a state where the airbag module 104 is connected to the steering wheel 102 having these constituent components described above and the steering cover 110 is further assembled with the steering wheel 102. In the present embodiment, a method for detaching the airbag module 104 only from the front airbag device 100 in the state of FIG. 1A is taken into consideration.

Figure 2:
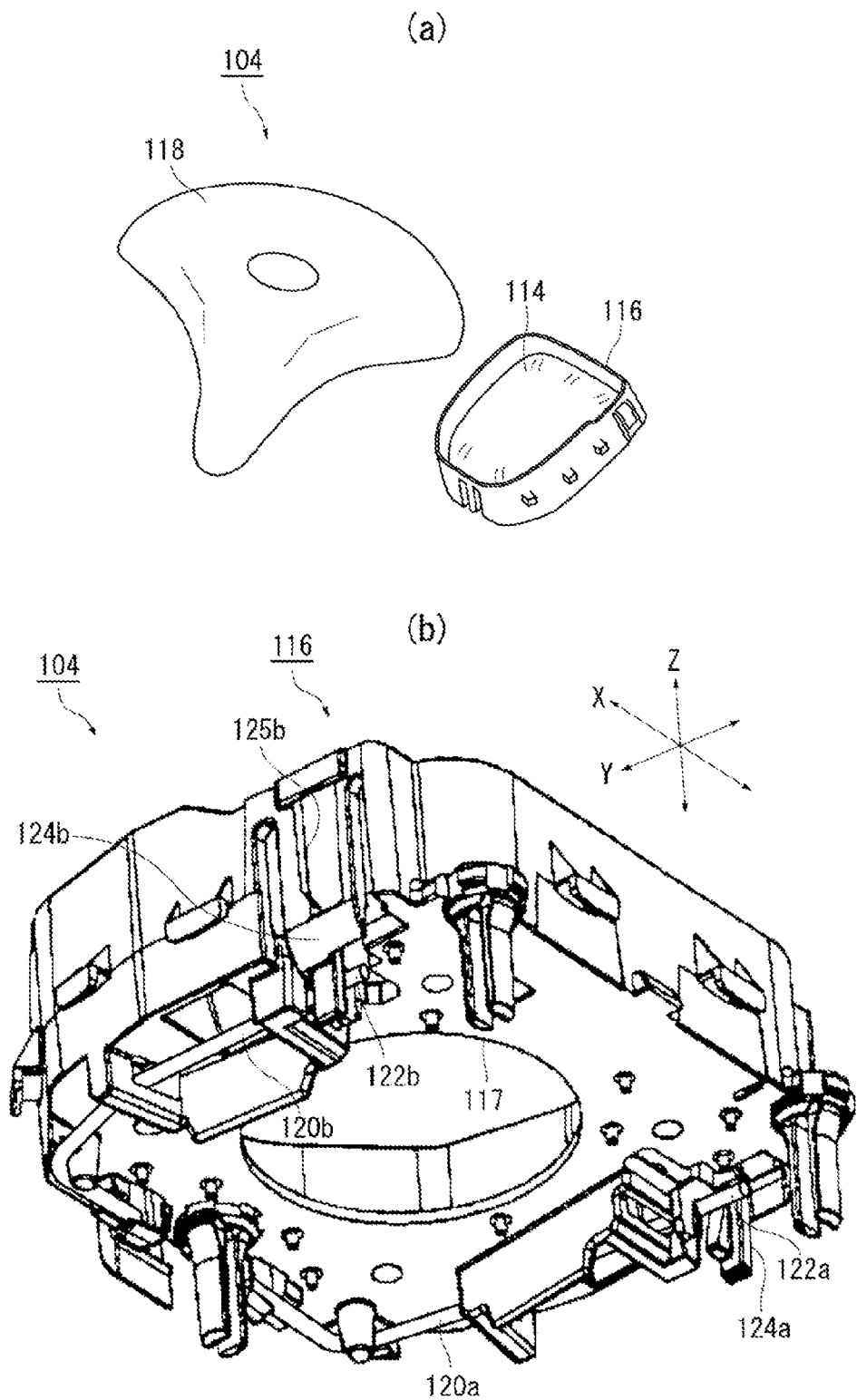
FIGS. 2A and 2B are diagrams illustrating an outline of an airbag module illustrated in FIG. 1B.

FIGS. 2A and 2B are diagrams illustrating an outline of the airbag module 104 illustrated in FIG. 1B. FIG. 2A is an exploded view of the airbag module 104 illustrated in FIG. 1B. As illustrated in FIG. 2A, the airbag module 104 includes the housing 116 that stores the airbag 114 in a folded state and a cover 118 that covers the housing 116. These housing 116 and cover 118 are formed from a synthetic resin.

FIG. 2B is a diagram illustrating a rear surface (the side close to the steering wheel 102 (see FIG. 1B)) of solely the housing 116 illustrated in FIG. 2A. A hole 117 is formed approximately at the center of the rear side of the housing 116, and an inflator (not illustrated) which is a gas generator is attached to the hole. Since the airbag module 104 (see FIG. 1A) also functions as a horn switch, terminals (not illustrated) and the like are also attached to the rear surface of the housing 116.

Two springs 120a and 120b serving as elastic bodies of the present embodiment are attached to the rear surface of the housing 116. The springs 120a and 120b are portions at which the retaining hooks 112a and 112b are caught when the airbag module 104 described with reference to FIG. 1B moves in a direction of being removed from the steering wheel 102. The springs 120a and 120b are metallic members formed in a rod shape and have elastic properties and thus can be bent. These springs 120a and 120b are not in contact with the retaining hooks 112a and 112b in a normal state. The rod-shaped spring is an example of an elastic body, and the present invention is not limited to this, and the elastic body may be configured as a planar spring or the like, for example.

Positioning tabs 124a and 124b on which the positioning hooks 111a and 111b (see FIG. 1B) of the steering wheel 102 are hooked are provided near end portions 122a and 122b of the springs 120a and 120b. The positioning tab 124b will be described by way of an example (the positioning tabs 124a and 124b have the same configuration). The positioning tab 124b is a portion extending in a planar shape, and an opening 125b is formed at the center of the positioning tab 124b so that the positioning hook 111b is hooked on. Since the housing 116 is formed of a resin, the positioning tab 124b also has flexible properties, and the base portion can be bent to be tilted. Since the positioning tab 124b is configured to be tilted in this manner, the positioning tab 126b can be connected to and disconnected from the positioning hook 111b.

In the present embodiment, when the airbag module 104 illustrated in FIG. 1A is detached from the steering wheel 102, the positioning tab 124b illustrated in FIG. 2B is bent to be tilted so that the positioning tab 124b is removed from the positioning hook 111b (see FIG. 1B), and the spring 120b is pressed, bent, and moved by the positioning tab 124b so that the spring 120b and the retaining hook 112b (see FIG. 1B) do not come into contact with each other so that they are not caught at each other. This will be described in detail below. The positioning tabs 124a and 124b have the same configuration, and the positioning tab 124a will be described by way of an example.

Figure 3:
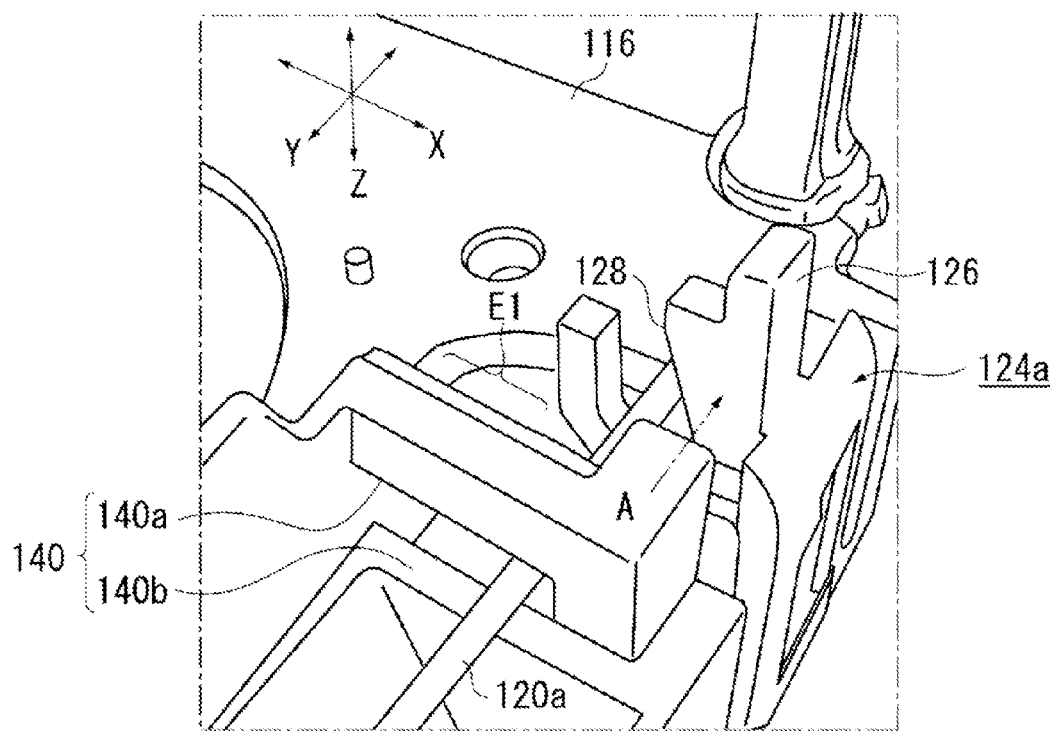
FIG. 3 is a perspective view illustrating the surrounding of a positioning tab illustrated in FIG. 2B.

FIG. 3 is a perspective view illustrating the surrounding area of the positioning tab 124a illustrated in FIG. 2B. An extension portion 126 is formed in the positioning tab 124a so that the shape of the positioning tab 124a is extended. The extension portion 126 is a portion that an operator presses with a tool 180 (see FIG. 5) when tilting the positioning tab 124a so as to detach the airbag module 104 from the steering wheel 102 (see FIG. 1B).

Moreover, in the present embodiment, an extrusion portion 128 is provided in a portion of the extension portion 126 which is located close to the spring 120a and which makes contact with the spring 120a when the positioning tab 124a is tilted. The extrusion portion 128 has such a shape that protrudes toward the spring 120a from the extension portion 126.

Figure 4:
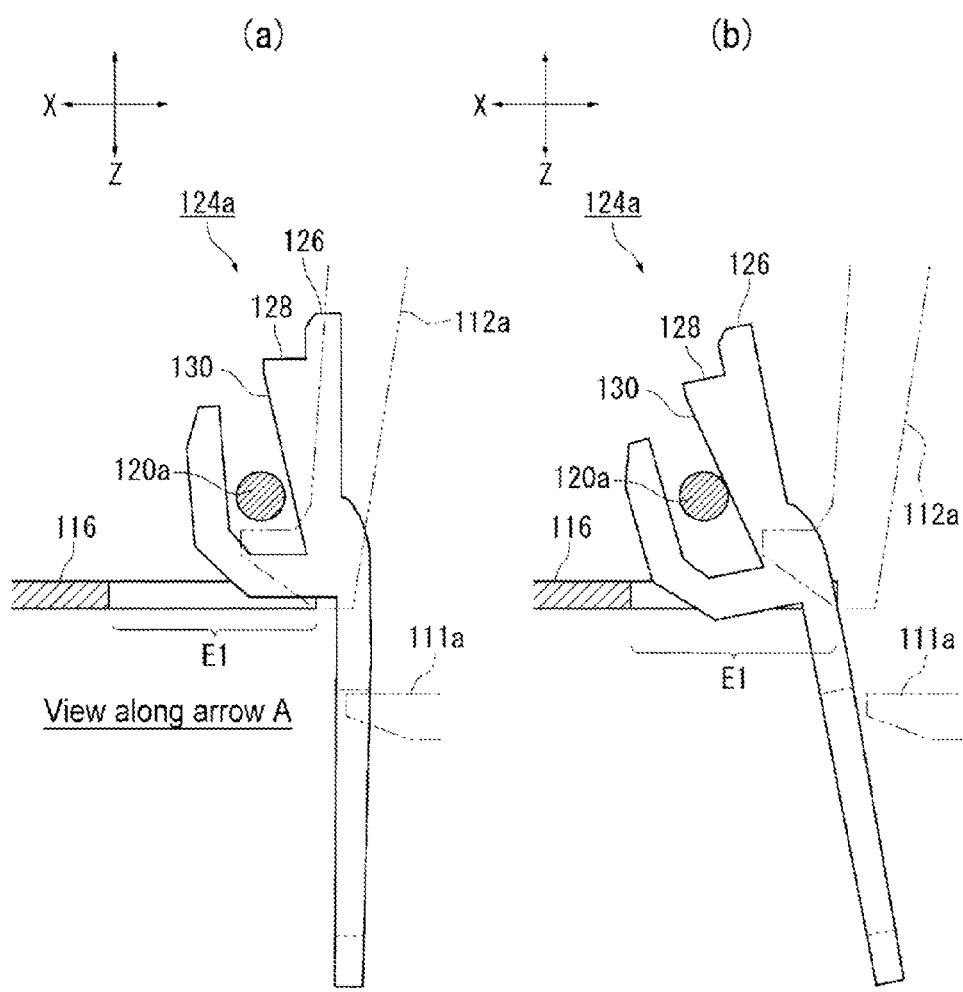
FIGS. 4A and 4B are diagrams illustrating the process of an operation of the positioning tab illustrated in FIG. 3.

FIGS. 4A and 4B are diagrams illustrating the process of an operation of the positioning tab 124a illustrated in FIG. 3. FIG. 4A is a view along arrow A of the positioning tab 124a illustrated in FIG. 3. FIG. 4A illustrates the retaining hook 112a by an imaginary line. When the extension portion 126 is pressed from the state of FIG. 4A so that the positioning tab 124a is bent toward the spring 120a, the positioning tab 124a is removed from the positioning hook 111a and the extrusion portion 128 presses and bends the spring 120a to move the spring 120a as illustrated in FIG. 4B, whereby a state, in which the contact between the spring 120a and the retaining hook 112a is obviated, is created. In this way, the airbag module 104 illustrated in FIG. 1A can be detached from the steering wheel 102.

In the present embodiment, as illustrated in FIG. 4A, the extrusion portion 128 has such an inclined shape that an edge 130 close to the spring 120a protrudes further toward the spring 120a as the protrusion of the edge 130 gradually increases upward. With this shape, the more the positioning tab 124a is tilted, the larger the moving distance of the spring 120a becomes when the spring 120a is pressed by the extrusion portion 128. Thus, the detaching operation of the airbag module 104 becomes simpler.

As illustrated in FIG. 2B, the positioning tabs 124a and 124b are provided near the end portions 122a and 122b of the springs 120a and 120b. The springs 120a and 120b have a rod shape, and it is easier to press and bend the springs 120a and 120b when force is applied to the end portions 122a and 122b. Thus, the positioning tabs 124a and 124b are provided near the end portions 122a and 122b so that the springs 120a and 120b can be pressed and bent with smaller force.

Reference is made again to FIG. 3. As illustrated in FIG. 3, a gap E1 is formed in a portion of the housing 116 in which the positioning tab 124a is provided and which is located close to the spring 120a. The gap is formed in this position so that the positioning tab 124a is bent and tilted as illustrated in FIG. 4B.

Moreover, a guide portion 140 is formed in the housing 116. The guide portion includes a beam portion 140a disposed on the housing 116 and an edge portion 140b disposed under (in the drawing) the beam portion 140a. The guide portion 140 restricts the movement in the Z-axis direction (illustrated in FIG. 4B) of the spring 120a and allows the movement in the X-axis direction only. Here, the retaining hook 112a extends in the Z-axis direction which is a detachment direction of the airbag module 104, and the moving direction of the spring 120a is restricted to the X-axis direction which is a direction orthogonal to the Z-axis direction in which the retaining hook 112a extends. In this manner, the spring 120a can be moved efficiently in only the direction of avoiding the retaining hook 112a.

Figure 5:
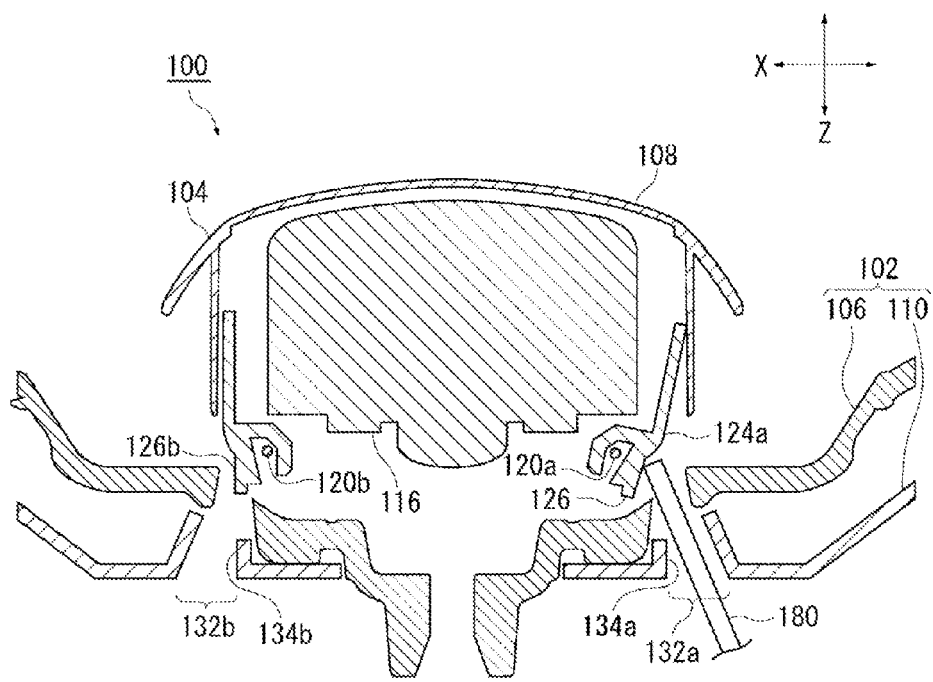
FIG. 5 is a cross-sectional view along line B-B of FIG. 1A.

FIG. 5 is a cross-sectional view along line B-B of FIG. 1A. As illustrated in FIG. 5, window portions 132a and 132b are provided at positions of the steering wheel 102 with which the extension portion 126 overlaps. The window portions 132a and 132b are gaps (or openings) for allowing the extension portion 126 to be visible from the outside. In the present embodiment, first, the tool 180 is inserted into the window portion 132a, and the extension portion 126 is pressed by the tool 180 so that the positioning tab 124a is bent and tilted. In this way, as described with reference to FIG. 4B, since the positioning tab 124a is removed from the positioning hook 111a and the spring 120a is moved in the X-axis direction so as not to make contact with the retaining hook 112a, the airbag module 104 can be detached from the steering wheel 102. The tool 180 used may be a general tool as long as it has a rod shape, and a driver or the like can be used, for example.

In the present embodiment, opening portions 134a and 134b of the steering cover 110 are included in the window portions 132a and 132b. The steering cover 110 is the cladding of the steering wheel 102. Since the window portions 132a and 132b also extend to the steering cover 110, even after the front airbag device 100 is assembled with the vehicle, only the airbag module 104 can be detached from the front airbag device 100 without disassembling the entire front airbag device 100. The window portion 132a may be configured such that a side of the extension portion 126 opposite to the tilting direction of the positioning tab 124a is visible. In this manner, the operator can easily press the extension portion 126 using the tool 180 (the same is true for the window portion 132b).

As described above, the front airbag device 100 enables the airbag module 104 only to be detached easily with a simple operation even after respective members are assembled. Thus, the labor and time required for operations when performing the maintenance of the airbag 114 or the like can be reduced.

(Modification of Extrusion Portion)

Figure 6:
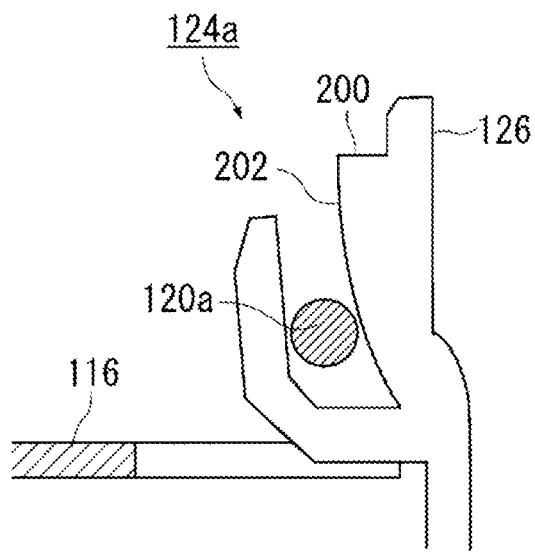
FIGS. 6A and 6B are diagrams illustrating modifications of an extrusion portion illustrated in FIG. 4A.
Figure 6:
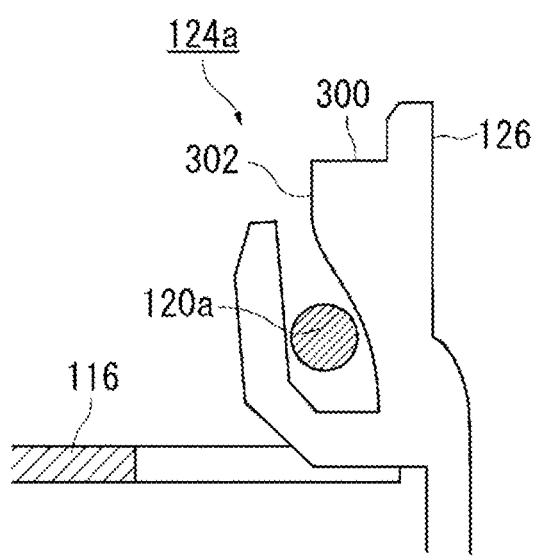

FIGS. 6A and 6B are diagrams illustrating modifications of the extrusion portion 128 illustrated in FIG. 4A. An edge 202 of an extrusion portion 200 illustrated in FIG. 6A draws an arc so as to protrude further toward the spring 120a as the protrusion of the edge 202 gradually increases upward unlike the edge 130 of the extrusion portion 128 illustrated in FIG. 4A. With this configuration, when the spring 120a is pressed and moved, the edge 202 can be moved more smoothly so as to make point-contact with the spring 120a. Moreover, with this configuration, since the more the extension portion 126 is bent, the larger the moving distance of the spring 120a becomes when the spring 120a is pressed by the extrusion portion 200, the detaching operation of the airbag module 104 described with reference to FIG. 5 becomes easier.

In an extrusion portion 300 illustrated in FIG. 6B, an edge 302 has a different shape from the other examples. The edge 302 of the extrusion portion 300 draws an S-curve so as to protrude further toward the spring 120a as the protrusion of the edge 302 gradually increases upward. With this configuration, the edge 302 makes point-contact with the spring 120a whereby the spring 120a can be moved more smoothly along the edge 302. Moreover, since the moving distance of the spring 120a when pressed by the extrusion portion 300 increases, the detaching operation of the airbag module 104 described with reference to FIG. 5 becomes easier.

(Modification of Extension Portion)

Figure 7:
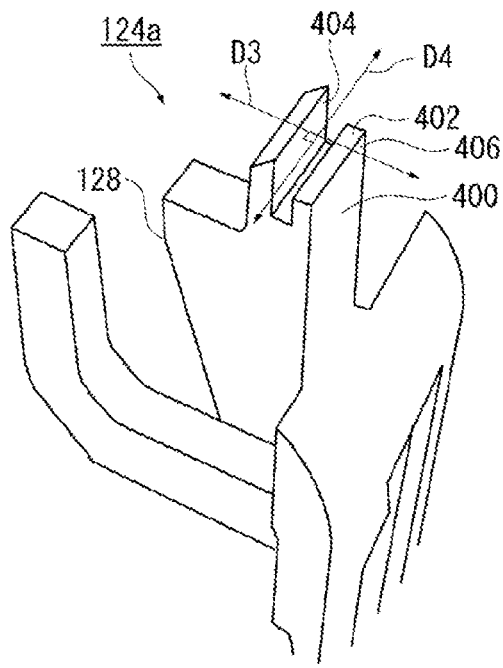
FIGS. 7A and 7B are diagrams illustrating modifications of an extension portion illustrated in FIG. 3.
Figure 7:
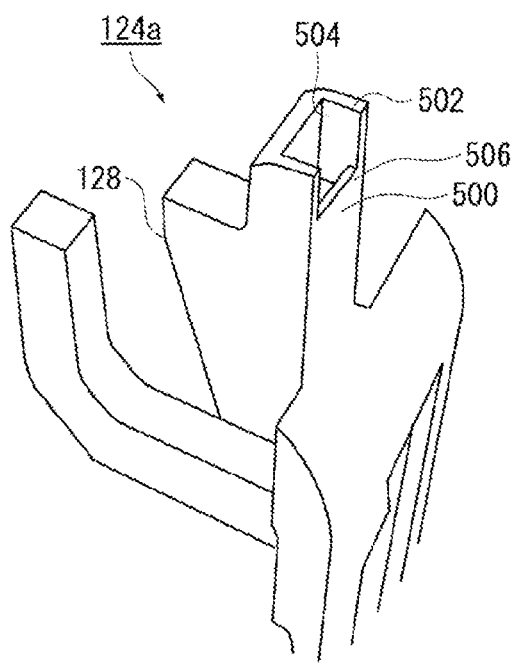

FIGS. 7A and 7B are diagrams illustrating modifications of the extension portion 126 illustrated in FIG. 3. In an extension portion 400 illustrated in FIG. 7A, an upper end surface 402 has a different shape from that of the extension portion 126 illustrated in FIG. 3. The extension portion 400 has a tool insertion groove portion 404 formed in the upper end surface 402. For example, the groove portion 404 may be formed linearly along a direction D4 orthogonal to the direction D3 of the spring 120a. For example, a flathead screw driver engages with the groove portion 404, and the positioning tab 124a can be easily pushed into the groove portion 404. In this case, it is preferable that a wall portion 406 of the groove portion 404 on a side opposite to the tilting direction of the positioning tab 124a is formed to be low. If so, it is possible to prevent the wall portion 406 from being broken by being pressed by the tool.

In an extension portion 500 illustrated in FIG. 7B, an upper end surface 502 has a different configuration from that of the other examples. A hole portion 504 is formed in the upper end surface 502 of the extension portion 500. Although the hole portion is just a rectangular hole, since the hole portion is formed in a certain size, a tool having a large width can be inserted therein. By inserting a tool therein, the positioning tab 124a can be easily pressed. It is preferable that a wall portion 506 of the hole portion 504 on a side opposite to the tilting direction of the positioning tab 124a is formed to be low. If so, it is possible to prevent the wall portion 506 from being broken by being pressed by the tool.

Figure 8A:
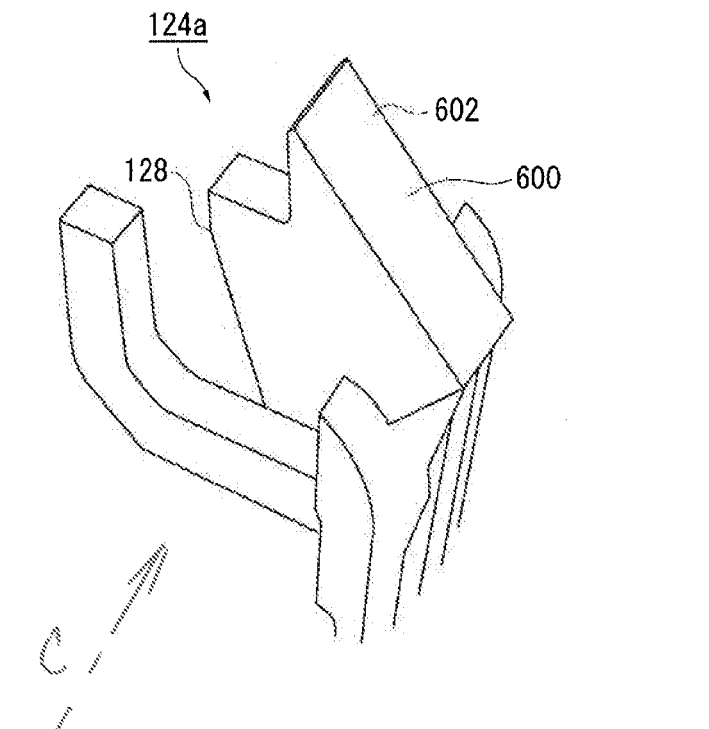
FIGS. 8A and 8B are diagrams illustrating a modification of an extension portion illustrated in FIG. 3.
Figure 8B:
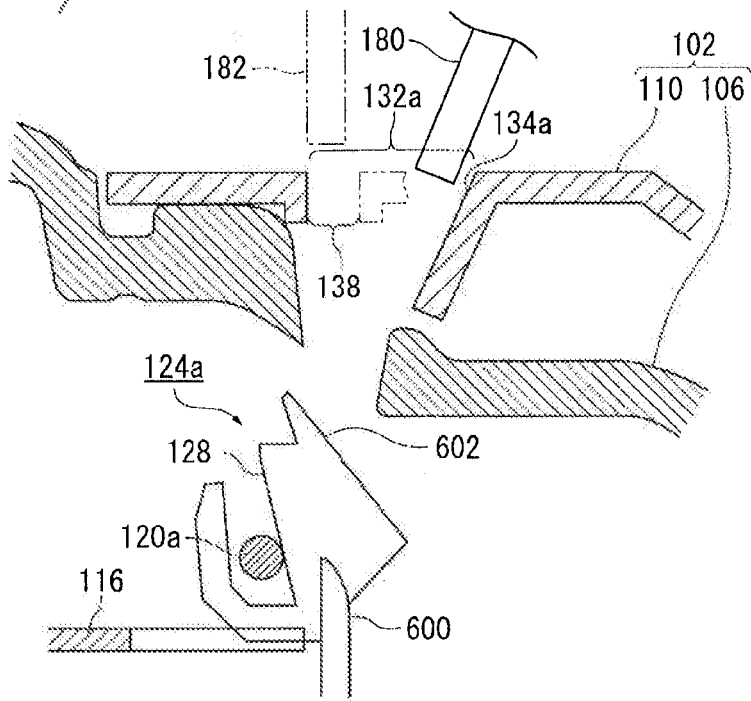

FIGS. 8A and 8B are also diagrams illustrating a modification of the extension portion 126 illustrated in FIG. 3. An extension portion 600 illustrated in FIG. 8A is characterized in the angle of a back surface 602. FIG. 8B is a diagram in which the portion near the window portion 132a illustrated in FIG. 5 is depicted in a view taken along arrow C of FIG. 8A. The back surface 602 is a surface of the extension portion 126 on a side opposite to the tilting direction of the positioning tab 124a. The back surface 602 is tilted in a direction (the left direction in the figure) that is tilted with respect to the extension direction (the upward direction in the figure) of the extension portion 126. With this back surface 602, the positioning tab can be easily pressed when the tool 180 is inserted from the window portion 132a. Moreover, even when the window portion 138 is present only immediately above the extension portion 126, and a tool 182, depicted by an imaginary line, is inserted from the window portion 138, it is convenient because the positioning tab 124a is bent toward the spring 120a when the back surface 602 is pressed from the above. Thus, with such a configuration, the detaching operation of the airbag module can be performed easier.

Preferred embodiments of the present invention have been described above with reference to accompanying drawings, but the described embodiments are exemplary, and the invention may be embodied and implemented in other ways, in accordance with various methods. Unless specifically indicated in the description of the present application, the invention is not restricted by the shape, size, configurational arrangement and so forth of the detailed parts depicted in the drawings. Furthermore, the expressions and terms used in the description of the present application are explanatory in purpose, and are not meant to be limiting in any way, unless restricting subject matter to that effect is specifically set forth in the description.

Therefore, a person skilled in the art can devise various alterations or modifications within the scope as set forth in the claims, and it is to be understood that these alterations and modifications belong, as a matter of course, to the technical scope of the present invention.

The invention claimed is:

1. A front airbag device for a vehicle, the airbag device comprising: a steering wheel of the vehicle and an airbag module that is attached to a center of the steering wheel,
the airbag module including an airbag and a housing that stores the airbag,
the steering wheel including a positioning hook that is hooked on the housing so as to restrict the position of the airbag module; and a retaining hook that extends toward the housing so as to prevent removal of the airbag module by being hooked on the housing when the airbag module moves in a direction of being removed from the steering wheel;
the housing including a positioning tab on which the positioning hook is hooked and which is configured to be connected to or disconnected from the positioning hook by being elastically deflected in a deflected direction; and
an elastic body on which the retaining hook is hooked when the airbag module moves in the direction of being removed from the steering wheel,
the positioning tab being provided near the elastic body and further including an extension portion that extends the shape of the positioning tab,
the steering wheel further including a window portion that allows the extension portion to be visible from the outside of the airbag device, and
when elastically deflected in the deflection direction, the positioning tab being configured to disconnect from the positioning hook and to press, bend, and move the elastic body so as to prevent the elastic body from making contact with the retaining hook during removal of the airbag module.

2. The front airbag device according to claim 1, wherein the housing has a gap formed on a side toward which the positioning tab is elastically deflected in the deflection direction enabling the positioning tab to be bent into a tilted orientation.

3. The front airbag device according to claim 1, wherein the retaining hook extends in a removal direction of the airbag module, and the housing further includes a guide portion that allows the elastic body to move only in a direction orthogonal to the removal direction of the retaining hook.

4. The front airbag device according to claim 1, wherein the steering wheel further includes a steering cover as an exterior cover attached to the steering wheel on a side opposite to the airbag module, and wherein the window portion includes an opening portion formed in the steering cover.

5. The front airbag device according to claim 1, wherein the window portion allows side of the extension portion that is opposite to the to the deflection direction to be visible through the window portion.

6. The front airbag device according to claim 1, wherein the positioning tab further includes an extrusion portion having a shape that protrudes in a direction toward the elastic body and that causes the elastic body to move when the positioning tab is elastically deflected in the deflection direction.

7. The front airbag device according to claim 6, wherein an edge of the extrusion portion is located on a side of the extrusion portion toward the elastic body, the edge being inclined such that the edge progressively protrudes further toward the elastic body moving upward along the edge.

8. The front airbag device according to claim 6, wherein an edge of the extrusion portion is located on a side of the extrusion portion toward the elastic body, the edge forming an arc so as to progressively protrude further toward the elastic body moving upward along the edge.

9. The front airbag device according to claim 6, wherein an edge of the extrusion portion is located on a side of the extrusion portion toward the elastic body, the edge forming an S-curve so as to progressively protrude further toward the elastic body moving upward along the edge.

10. The front airbag device according to claim 6, wherein the extension portion has a surface on a side opposite to the deflection direction, the surface being inclined toward the deflection direction with respect to a direction in which the extension portion extends.

11. The front airbag device according to claim 1, wherein the positioning tab is provided near an end portion of the elastic body.

12. The front airbag device according to claim 11, wherein the extension portion has a groove portion formed in an upper end surface of the extension portion, the groove portion being configured to receive a predetermined tool inserted therein.

13. The front airbag device according to claim 11, wherein the extension portion has a hole portion formed in an upper end surface of the extension portion, the hole portion being configured to receive a predetermined tool inserted therein.

* * * * *